US009827976B2

(12) United States Patent
Ichikawa

(10) Patent No.: US 9,827,976 B2
(45) Date of Patent: Nov. 28, 2017

(54) NON-CONTACT POWER RECEPTION DEVICE AND VEHICLE INCLUDING THE SAME

(75) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 519 days.

(21) Appl. No.: 13/122,625

(22) PCT Filed: Oct. 9, 2008

(86) PCT No.: PCT/JP2008/068356
§ 371 (c)(1),
(2), (4) Date: Apr. 5, 2011

(87) PCT Pub. No.: WO2010/041318
PCT Pub. Date: Apr. 15, 2010

(65) Prior Publication Data
US 2011/0181123 A1    Jul. 28, 2011

(51) Int. Cl.
*H01F 27/42*    (2006.01)
*H01F 37/00*    (2006.01)
(Continued)

(52) U.S. Cl.
CPC ............ *B60W 20/15* (2016.01); *B60K 6/445* (2013.01); *B60L 11/123* (2013.01); *B60L 11/14* (2013.01);
(Continued)

(58) Field of Classification Search
CPC . H02J 17/00; H02J 5/005; H02J 7/025; H01F 38/14; B60L 11/182; B60C 23/00;
(Continued)

(56) References Cited

U.S. PATENT DOCUMENTS 3,835,389 A * 9/1974 Helfen ............................. 307/3
3,886,377 A * 5/1975 Taketa ................... G05B 19/04
307/129
(Continued)

FOREIGN PATENT DOCUMENTS

AU    2006269374 B3    1/2007
AU    2006269374 C1    1/2007
(Continued)

OTHER PUBLICATIONS

Translation of Decision on Grant Patent for Invention dated Mar. 21, 2012 issued in Russian Patent Application No. 2011118343/07(027130).
(Continued)

*Primary Examiner* — Rexford Barnie
*Assistant Examiner* — Jagdeep Dhillon
(74) *Attorney, Agent, or Firm* — Oliff PLC

(57) ABSTRACT

A non-contact power reception device includes a load such as a power storage device identified as a subject of power feeding, and a secondary self-resonant coil receiving electric power to be supplied to said load from an external primary self-resonant coil. The secondary self-resonant coil is configured so as to be switchable between a first state and a second state. The first state is selected in a power reception mode in which the secondary self-resonant coil is magnetically coupled with the primary self-resonant coil through resonance of a magnetic field. The second state is selected in a power non-reception mode in which the magnetic coupling of the secondary self-resonant coil with the primary self-resonant coil through resonance is weaker than in the first state.

15 Claims, 9 Drawing Sheets

(51) Int. Cl.

| | | |
|---|---|---|
| *H01F 38/00* | (2006.01) | |
| *B60W 20/15* | (2016.01) | |
| *B60K 6/445* | (2007.10) | |
| *B60L 11/12* | (2006.01) | |
| *B60L 11/14* | (2006.01) | |
| *B60L 11/18* | (2006.01) | |
| *B60W 10/26* | (2006.01) | |
| *H02J 7/02* | (2016.01) | |
| *H04B 5/00* | (2006.01) | |
| *H02J 50/12* | (2016.01) | |
| *H02J 50/80* | (2016.01) | |
| *B60K 1/02* | (2006.01) | |
| *B60K 1/04* | (2006.01) | |
| *B60W 20/00* | (2016.01) | |
| *H02J 5/00* | (2016.01) | |

(52) U.S. Cl.
CPC ......... *B60L 11/182* (2013.01); *B60L 11/1838* (2013.01); *B60W 10/26* (2013.01); *H01F 38/00* (2013.01); *H02J 7/025* (2013.01); *H02J 50/12* (2016.02); *H02J 50/80* (2016.02); *H04B 5/0031* (2013.01); *H04B 5/0037* (2013.01); *B60K 1/02* (2013.01); *B60K 1/04* (2013.01); *B60L 2220/14* (2013.01); *B60W 20/00* (2013.01); *B60W 2510/244* (2013.01); *H02J 5/005* (2013.01); *Y02T 10/6217* (2013.01); *Y02T 10/6239* (2013.01); *Y02T 10/6269* (2013.01); *Y02T 10/7005* (2013.01); *Y02T 10/7072* (2013.01); *Y02T 10/7077* (2013.01); *Y02T 90/121* (2013.01); *Y02T 90/122* (2013.01); *Y02T 90/128* (2013.01); *Y02T 90/14* (2013.01); *Y02T 90/163* (2013.01)

(58) Field of Classification Search
CPC ........ H05B 41/14; B60R 25/102; H04B 3/54; G06F 1/04
USPC .................. 307/104, 157; 315/225, 119, 277; 363/50, 56; 340/448, 442, 445; 73/708, 73/715, 723; 325/64, 37, 113, 394, 26; 331/179, 2, 8, 10, 11, 16–18, 25
See application file for complete search history.

(56) References Cited

U.S. PATENT DOCUMENTS

| | | | | |
|---|---|---|---|---|
| 5,751,115 A * | 5/1998 | Jayaraman | ......... | H05B 41/2828 307/157 |
| 5,898,579 A * | 4/1999 | Boys et al. | ...................... | 363/23 |
| 6,124,787 A * | 9/2000 | Isakov | ................ | B60C 23/0428 340/442 |
| 7,183,673 B2 * | 2/2007 | Dinn | ...................... | G08C 17/04 102/426 |
| 7,656,245 B2 * | 2/2010 | McCorquodale et al. | .... | 331/179 |
| 7,741,734 B2 | 6/2010 | Joannopoulos et al. | | |
| 8,552,597 B2 * | 10/2013 | Song | ...................... | H02J 1/102 307/104 |
| 9,130,407 B2 * | 9/2015 | Toncich | ............... | G06K 7/0008 |
| 2002/0051435 A1 * | 5/2002 | Giallorenzi | .......... | H04B 7/2621 370/335 |
| 2002/0057075 A1 | 5/2002 | Takashige et al. | | |
| 2002/0183003 A1 * | 12/2002 | Chang | ...................... | H04B 5/02 455/41.1 |
| 2004/0102173 A1 * | 5/2004 | Darabi | ................ | H04W 52/028 455/307 |
| 2004/0198255 A1 * | 10/2004 | Hayashida | ................ | B60R 25/102 455/99 |
| 2004/0201361 A1 | 10/2004 | Koh et al. | | |
| 2005/0068019 A1 | 3/2005 | Nakamura et al. | | |
| 2005/0245207 A1 * | 11/2005 | Suzuki | ................. | H04B 7/0871 455/101 |
| 2006/0131294 A1 | 6/2006 | Lindig | | |
| 2006/0241826 A1 | 10/2006 | Ishishita et al. | | |
| 2007/0109708 A1 | 5/2007 | Hussman et al. | | |
| 2007/0222542 A1 | 9/2007 | Joannopoulos et al. | | |
| 2007/0268018 A1 * | 11/2007 | Wendt | ................ | G01R 33/3628 324/301 |
| 2008/0076351 A1 * | 3/2008 | Washiro | ................ | H04B 5/0031 455/41.1 |
| 2008/0174267 A1 | 7/2008 | Onishi et al. | | |
| 2008/0180332 A1 * | 7/2008 | Noro | ...................... | H01Q 1/1271 343/713 |
| 2008/0211455 A1 | 9/2008 | Park et al. | | |
| 2008/0265684 A1 * | 10/2008 | Farkas | ................... | B60L 11/005 307/104 |
| 2008/0278264 A1 | 11/2008 | Karalis et al. | | |
| 2009/0051224 A1 * | 2/2009 | Cook | ....................... | H02J 7/025 307/104 |
| 2009/0079270 A1 * | 3/2009 | Jin | ......................... | H02J 7/025 307/104 |
| 2009/0195332 A1 | 8/2009 | Joannopoulos et al. | | |
| 2009/0195333 A1 | 8/2009 | Joannopoulos et al. | | |
| 2009/0206675 A1 * | 8/2009 | Camurati | ................ | H02J 17/00 307/104 |
| 2009/0224856 A1 | 9/2009 | Karalis et al. | | |
| 2009/0230777 A1 * | 9/2009 | Baarman | ................. | H01F 38/14 307/104 |
| 2009/0243394 A1 * | 10/2009 | Levine | ..................... | H02J 5/005 307/104 |
| 2009/0267709 A1 | 10/2009 | Joannopoulos et al. | | |
| 2009/0267710 A1 | 10/2009 | Joannopoulos et al. | | |
| 2009/0286476 A1 | 11/2009 | Toncich et al. | | |
| 2010/0065352 A1 * | 3/2010 | Ichikawa | ............... | B60L 11/182 180/65.8 |
| 2010/0096934 A1 | 4/2010 | Joannopoulos et al. | | |
| 2010/0102639 A1 | 4/2010 | Joannopoulos et al. | | |
| 2010/0102640 A1 | 4/2010 | Joannopoulos et al. | | |
| 2010/0102641 A1 | 4/2010 | Joannopoulos et al. | | |
| 2010/0117455 A1 | 5/2010 | Joannopoulos et al. | | |
| 2010/0117456 A1 | 5/2010 | Karalis et al. | | |
| 2010/0123353 A1 | 5/2010 | Joannopoulos et al. | | |
| 2010/0123354 A1 | 5/2010 | Joannopoulos et al. | | |
| 2010/0123355 A1 | 5/2010 | Joannopoulos et al. | | |
| 2010/0127573 A1 | 5/2010 | Joannopoulos et al. | | |
| 2010/0127574 A1 | 5/2010 | Joannopoulos et al. | | |
| 2010/0127575 A1 | 5/2010 | Joannopoulos et al. | | |
| 2010/0133918 A1 | 6/2010 | Joannopoulos et al. | | |
| 2010/0133919 A1 | 6/2010 | Joannopoulos et al. | | |
| 2010/0133920 A1 | 6/2010 | Joannopoulos et al. | | |
| 2010/0171370 A1 | 7/2010 | Karalis et al. | | |
| 2010/0181844 A1 | 7/2010 | Karalis et al. | | |
| 2010/0187911 A1 | 7/2010 | Joannopoulos et al. | | |
| 2010/0201205 A1 | 8/2010 | Karalis et al. | | |
| 2010/0207458 A1 | 8/2010 | Joannopoulos et al. | | |
| 2010/0225175 A1 | 9/2010 | Karalis et al. | | |
| 2010/0225271 A1 | 9/2010 | Oyobe et al. | | |
| 2010/0231053 A1 | 9/2010 | Karalis et al. | | |
| 2010/0237706 A1 | 9/2010 | Karalis et al. | | |
| 2010/0237707 A1 | 9/2010 | Karalis et al. | | |
| 2010/0237708 A1 | 9/2010 | Karalis et al. | | |
| 2010/0253152 A1 | 10/2010 | Karalis et al. | | |
| 2010/0264745 A1 | 10/2010 | Karalis et al. | | |
| 2010/0295506 A1 * | 11/2010 | Ichikawa | ............... | B60L 11/123 320/108 |
| 2011/0018358 A1 * | 1/2011 | Kozakai | ................. | H02J 7/025 307/104 |
| 2011/0018494 A1 * | 1/2011 | Mita | ..................... | H02J 7/025 320/108 |
| 2011/0121778 A1 | 5/2011 | Oyobe et al. | | |
| 2011/0316349 A1 * | 12/2011 | Hashiguchi | .......... | H04B 5/0093 307/104 |
| 2012/0032525 A1 | 2/2012 | Oyobe et al. | | |
| 2012/0153894 A1 * | 6/2012 | Widmer | ................. | H04B 5/0037 320/108 |

(56) References Cited

U.S. PATENT DOCUMENTS

2015/0333530 A1* 11/2015 Moyer .................. H02J 7/025
                                                  307/104

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 1536735 A | 10/2004 |
| CN | 1802274 A | 7/2006 |
| CN | 101233666 A | 7/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | H08-126120 A | 5/1996 |
| JP | 2001-238372 | 8/2001 |
| JP | 2002-78247 | 3/2002 |
| JP | 2008-137451 A | 6/2008 |
| JP | 2008-220130 | 9/2008 |
| JP | A-2009-501510 | 1/2009 |
| JP | A-2009-106136 | 5/2009 |
| KR | 1998-024391 A | 7/1998 |
| KR | 2008-0031398 A | 4/2008 |
| KR | 2010-0015954 A | 2/2010 |
| KR | 10-2011-0010104 A | 1/2011 |
| RU | 2006 100 189 A | 7/2007 |
| WO | WO 2007/008646 A2 | 1/2007 |
| WO | WO 2008/118178 A1 | 10/2008 |
| WO | WO 2009/140223 A1 | 11/2009 |

OTHER PUBLICATIONS

Jun. 28, 2012 Korean Office Action issued in Patent Application No. 10-2011-7010439 (with partial translation).
Kurs, A. et al., "Wireless Power Transfer via Strongly Coupled Magnetic Resonances," *Science*, Jul. 6, 2007, pp. 83-86, vol. 317.
International Search Report issued in International Application No. PCT/JP2008/068356 dated Dec. 22, 2008 (with translation).

* cited by examiner

NON-CONTACT POWER RECEPTION DEVICE AND VEHICLE INCLUDING THE SAME

TECHNICAL FIELD

The present invention relates to a non-contact power reception device and a vehicle including the same, particularly, to the technique of supplying electric power to a vehicle in a non-contact manner from a power source external to the vehicle.

BACKGROUND ART

Great attention is focused on electrical powered vehicles such as an electric vehicle and hybrid vehicle as environment-friendly vehicles. These vehicles incorporate an electric motor for generating a driving force for running, and a rechargeable power storage device for storing electric power to be supplied to the electric motor. A hybrid vehicle refers to a vehicle incorporating an internal combustion engine as a power source, in addition to an electric motor, or a vehicle further incorporating a fuel cell in addition to a power storage device as the direct current power source for driving the vehicle.

Among the hybrid vehicles there is known a vehicle that allows charging of the vehicle-mounted power storage device from a power source external to the vehicle, likewise with an electric vehicle. For example, the so-called "plug-in hybrid vehicle" is known that allows the power storage device to be charged from a general household power supply by establishing connection between the plug socket located at an establishment and the charging inlet provided at the vehicle through a charging cable.

As a method for power transfer, attention is recently focused on wireless electrical power transmission without using power supply cords and/or cables for electrical transmission. Three promising approaches of this wireless power transfer technique are known, i.e. power transfer using electromagnetic induction, power transfer using electromagnetic waves, and power transfer through the resonance method.

The resonance method thereof is a non-contact power transfer approach transferring power via an electromagnetic field by causing resonance at a pair of resonators (for example, a pair of self-resonant coils) at the electromagnetic field (near field), allowing electric power as high as several kW to be transferred over a relatively long distance (for example, several meters) (refer to Non-Patent Document 1).

Patent Document 1: WO 2007/008646

Non-Patent Document 1: Andre Kurs et al., "Wireless Power Transfer via Strongly Coupled Magnetic Resonances", [online], Jul. 6, 2007, SCIENCE, Volume 317, pp. 83-86, [Searched on Sep. 12, 2007], Internet <URL; http://www.sciencemag. org/cgi/reprint/317/5834/83.pdf>

DISCLOSURE OF THE INVENTION

Problems to be Solved by the Invention

In the resonance method, electric power is transferred when the condition for resonance between a resonator of the power transmission side and a resonator of the power reception side is met. However, there is a case where the power reception side does not desire reception of electric power such as when the power storage device is at a full state or the like.

In the case where the wireless power transfer technique disclosed in the aforementioned "Wireless Power Transfer via Strongly Coupled Magnetic Resonances" is applied to a power feeding system for a vehicle, how the power reception is to be stopped when power reception at the vehicle is not required is an issue. The aforementioned documents do not particularly teach about a specific configuration or control approach for stopping power reception.

An object of the present invention is to provide a non-contact power reception device and vehicle that can stop power reception reliably in power feeding using a resonance method.

Means for Solving the Problems

A non-contact power reception device according to the present invention includes a load identified as a subject of power feeding, and a secondary self-resonant coil receiving electric power to be supplied to the load from a primary self-resonant coil external to the vehicle. The secondary self-resonant coil is configured so as to be switchable between a first state and a second state. The first state is selected in a power reception mode in which the secondary self-resonant coil is magnetically coupled with the primary self-resonant coil through resonance of a magnetic field. The second state is selected in a power non-reception mode in which the magnetic coupling of the secondary self-resonant coil with the primary self-resonant coil through resonance is weaker than in the first state.

Preferably, the secondary self-resonant coil has an impedance differing between the first state and the second state.

More preferably, the secondary self-resonant coil includes a coil body and an inductance modifier modifying the inductance of the coil body.

Further preferably, the coil body is divided at a central region into a first portion and a second portion. The inductance modifier includes a relay provided at the central region of the coil body, connecting the first portion and the second portion in a power reception mode, and disconnecting the first portion from the second portion in a power non-reception mode.

Preferably, the secondary self-resonant coil includes a coil body, and a capacitance modifier modifying the capacitance of the coil body.

Further preferably, the capacitance modifier includes a leading line connected to an end of the coil body, a relay connected to the leading line, and a capacitor connected to the coil body via the leading line by the relay in a power reception mode, and disconnected from the coil body by the relay in a power non-reception mode.

Further preferably, the non-contact power reception device further includes a discharging resistor for setting the capacitor at a discharging state in a power non-reception mode.

Further preferably, there is included another relay disconnecting the discharging resistor from the capacitor in a power reception mode, and connecting the discharging resistor with the capacitor in a power non-reception mode.

Further preferably, the relay disconnects the discharging resistor from the capacitor in a power reception mode, and connects the discharging resistor with the capacitor in a power non-reception mode.

Preferably, the non-contact power reception device further includes a voltage converter voltage-converting an input voltage for supply to a load, and a rectifier rectifying AC voltage and providing the rectified voltage to the voltage converter as the input voltage. The secondary self-resonant coil receives electric power from the primary self-resonant coil to cause generation of AC voltage to be supplied to the rectifier.

Further preferably, the non-contact power reception device is mounted on a vehicle to receive electric power from a feeding device including the primary self-resonant coil external to the vehicle. The non-contact power reception device further includes a control unit controlling switching of the secondary self-resonant coil between the first state and the second state. The control unit sets the secondary self-resonant coil at the first state and the second state when the vehicle meets and not meets, respectively, a power reception condition.

Further preferably, the vehicle includes a power storage device receiving charge electric power from the non-contact power reception device as the load. The power reception condition includes the condition that the state of charge of the power storage device is less than a threshold value.

More preferably, the power reception condition includes the condition that a predetermined failure is not occurring at the vehicle.

According to another aspect of the present invention, a vehicle includes a non-contact power reception device receiving electric power transferred in a non-contact manner from outside the vehicle. The non-contact power reception device includes a load identified as the subject of power feeding, and a secondary self-resonant coil receiving electric power to be supplied to the load from an external primary self-resonant coil. The secondary self-resonant coil is configured so as to be switchable between a first state and a second state. The first state is selected in a power reception mode in which the secondary self-resonant coil is magnetically coupled with the primary self-resonant coil through resonance of a magnetic field. The second state is selected in a power non-reception mode in which the magnetic coupling of the secondary self-resonant coil with the primary self-resonant coil through resonance is weaker than in the first state.

Preferably, the secondary self-resonant coil has an impedance differing between the first state and the second state.

Effects of the Invention

According to the present invention, power reception can be stopped reliably when reception of electric power is not desired in power feeding using a resonance method.

Figure 1:
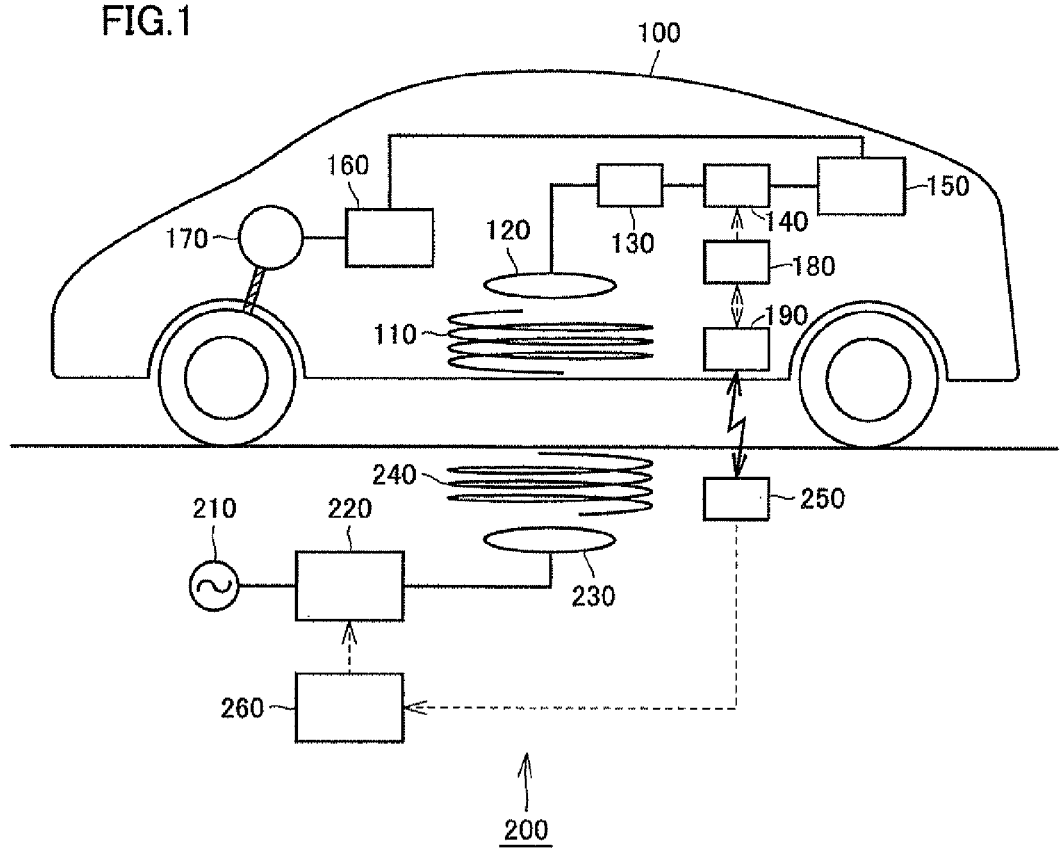
FIG. 1 represents an entire configuration of a power feeding system according to a first embodiment of the present invention.

DESCRIPTION OF THE REFERENCE SIGNS 100 electrical powered vehicle; 110, 110A, 110A1, 110B, 110C, 340 secondary self-resonant coil; 111 coil body; 112 relay; 113 first portion; 114 second portion; 115 inductance modifier; 125, 350 secondary coil; 130 rectifier; 140 converter; 142 DC/AC conversion unit; 144 transformer unit; 146 rectifier unit; 150 power storage device; 162 boost converter; 164, 166 inverter; 170 motor; 172, 174 motor generator; 176 engine; 177 power split device; 178 driving wheel; 190 communication device; 191, 192 voltage sensor; 194 current sensor; 200 power feeding device; 210 AC power source; 220 high frequency power driver; 230, 320 primary coil; 240, 330 primary self-resonant coil; 250 communication device; 310 high frequency power source; 311 coil body; 312A, 312A1, 312B, 312C capacitance modifier; 313 capacitor; 314 discharging resistor; 315, 316, 317 relay; 321, 322 leading line; 360 load; 180 vehicle ECU; PL2 positive line; SMR1, SMR2 system main relay.

BEST MODES FOR CARRYING OUT THE INVENTION

Embodiments of the present invention will be described hereinafter in detail with reference to the drawings. The same or corresponding elements in the drawings have the same reference characters allotted, and description thereof will not be repeated.

First Embodiment

FIG. 1 represents an entire configuration of a power feeding system according to a first embodiment of the present invention. Referring to FIG. 1, the power feeding system includes an electrical powered vehicle 100, and a power feeding device 200. Electrical powered vehicle 100 includes a secondary self-resonant coil 110, a secondary coil 120, a rectifier 130, a DC/DC converter 140, and a power storage device 150. Electrical powered vehicle 100 further includes a power control unit (hereinafter, also referred to as PCU) 160, a motor 170, a vehicle ECU (Electronic Control Unit) 180, and a communication device 190.

Although secondary self-resonant coil 110 is arranged at the lower portion of the vehicle body, it may be arranged at the upper portion of the vehicle body if power feeding device 200 is disposed above the vehicle. Secondary self-resonant coil 110 is an LC resonant coil having both ends open (non-connected), and receives the electric power from power feeding device 200 by resonating with a primary self-resonant coil 240 of power feeding device 200 (described afterwards) via an electromagnetic field. Although the capacitor component of secondary self-resonant coil 110 corresponds to the floating capacitance of the coil here, a capacitor may be provided across the ends of the coil.

Secondary self-resonant coil 110 has its number of windings set appropriately such that the Q value representing the resonance strength between primary self-resonant coil 240 and secondary self-resonant coil 110 (for example, Q>100), the κ value representing the degree of coupling thereof and the like become higher based on the distance from primary self-resonant coil 240 of power feeding device 200, the resonant frequency of primary self-resonant coil 240 and secondary self-resonant coil 110, and the like.

Secondary coil 120 is arranged coaxial with secondary self-resonant coil 110, and can be coupled magnetically with secondary self-resonant coil 110 by electromagnetic induction. Secondary coil 120 extracts the electric power received by secondary self-resonant coil 110 through electromagnetic induction for output to rectifier 130. Rectifier 130 rectifies AC power extracted by secondary coil 120.

DC/DC converter 140 responds to a control signal from vehicle ECU 180 to convert the electric power rectified by rectifier 130 to the voltage level of power storage device 150 for output thereto. In the case where power is received from power feeding device 200 during a running operation of the vehicle (in this case, power feeding device 200 may be arranged, for example, at the upper portion or side portion of the vehicle), DC/DC converter 140 may convert the electric power rectified by rectifier 130 into system voltage for direct supply to PCU 160. DC/DC converter 140 is not necessarily required, and a configuration may be employed in which the AC electric power extracted by secondary coil 120 is rectified by rectifier 130 and then directly applied to power storage device 150.

Power storage device 150 is a rechargeable DC power source, and includes a secondary battery such as of lithium ion or nickel-metal hydride. Power storage device 150 stores the electric power supplied from DC/DC converter 140, as well as the regenerative electric power generated by motor 170. Power storage device 150 supplies the stored electric power to PCU 160. A capacitor of large capacitance may be employed as power storage device 150. Any power buffer is applicable as long as it can temporarily store the electric power supplied from power feeding device 200 and/or the regenerative electric power from motor 170 and supply the stored electric power to PCU 160.

PCU 160 drives motor 170 by the electric power output from power storage device 150 or the electric power directly supplied from DC/DC converter 140. PCU 160 rectifies the regenerative electric power generated by motor 170 for output to power storage device 150, whereby power storage device 150 is charged. Motor 170 is driven by PCU 160 to generate vehicle driving power, which is provided to driving wheels. Motor 170 generates electric power using the kinetic energy received from driving wheels and an engine not shown, and outputs the generated regenerative electric power to PCU 160.

In a vehicle running mode, vehicle ECU 180 controls PCU 160 based on the vehicle running state and/or the state of charge (hereinafter, also referred to, as "SOC") of power storage device 150. Communication device 190 functions as a communication interface for wireless communication with power feeding device 200 external to the vehicle.

Power feeding device 200 includes an AC power source 210, a high frequency power driver 220, a primary coil 230, a primary self-resonant coil 240, a communication device 250, and an ECU 260.

AC power source 210 is external to the vehicle, and is a system power source, for example. High frequency power driver 220 converts the electric power received from AC power source 210 into an electric power of high frequency. The converted high frequency electric power is supplied to primary coil 230. The frequency of the high frequency electric power generated by high frequency power driver 220 is 1 M to ten and several MHz, for example.

Primary coil 230 is arranged coaxial with primary self-resonant coil 240, and can be coupled magnetically with primary self-resonant coil 240 by electromagnetic induction. Primary coil 230 feeds the high frequency electric power supplied from high frequency power driver 220 to primary self-resonant coil 240 by electromagnetic induction.

Although primary self-resonant coil 240 is arranged in proximity to the ground, it may be arranged above or at the side of the vehicle in the case where power is fed to electrical powered vehicle 100 from above the vehicle. Primary self-resonant coil 240 is similarly an LC resonant coil having both ends open (non-contact), and transfers electric power to electrical powered vehicle 100 by resonating with secondary self-resonant coil 110 of electrical powered vehicle 100 via an electromagnetic field. Although the capacitor component of primary self-resonant coil 240 similarly corresponds to the floating capacitance of the coil, a capacitor may be connected across the ends of the coil.

Primary self-resonant coil 240 has its number of windings set appropriately such that the Q value (for example, Q>100), the coupling degree κ and the like become higher based on the distance from secondary self-resonant coil 110 of electrical powered vehicle 100, the resonant frequency of primary self-resonant coil 240 and secondary self-resonant coil 110, and the like.

Communication device 250 functions as a communication interface to effect wireless communication with electrical powered vehicle 100 that is the destination of power feeding. ECU 260 controls high frequency power driver 220 such that the reception electric power at electrical powered vehicle 100 attains a target value. Specifically, ECU 260 obtains from electrical powered vehicle 100 the reception electric power and its target value of electrical powered vehicle 100 through communication device 250 and controls the output of high frequency power driver 220 such that the reception electric power at electrical powered vehicle 100 matches the target value. ECU 260 can transmit the impedance value of power feeding device 200 to electrical powered vehicle 100.

Figure 2:
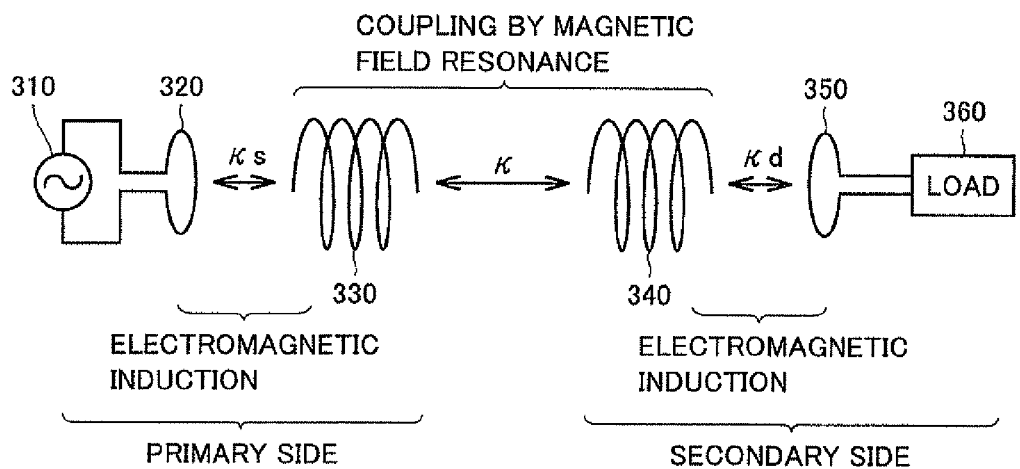
FIG. 2 is a diagram to describe the mechanism of power transmission by a resonance method.

FIG. 2 is a diagram to describe the mechanism of power transmission by the resonance method. Referring to FIG. 2, the resonance method is similar to the resonance of two tuning forks. By the resonance of two LC resonant coils having the same natural frequency at the electromagnetic field (near field), electric power is transferred from one coil to the other coil via the electromagnetic field.

Specifically, primary coil 320 is connected to high frequency power source 310, and electric power of a frequency as high as 1 M to ten and several MHz is supplied to primary self-resonant coil 330 that is magnetically coupled with primary coil 320 by electromagnetic induction. Primary self-resonant coil 330 is an LC resonator based on the coil's inductance and floating capacitance, resonating with secondary self-resonant coil 340 having the same resonant frequency as primary self-resonant coil 330 via an electromagnetic field (near field). Accordingly, energy (electric power) is transferred from primary self-resonant coil 330 to secondary self-resonant coil 340 via the electromagnetic field. The energy (electric power) transferred to secondary self-resonant coil 340 is extracted by secondary coil 350 magnetically coupled with secondary self-resonant coil 340 through electromagnetic induction to be provided to a load 360.

The corresponding relationship with the elements in FIG. 1 will be described hereinafter. AC power source 210 and high frequency power driver 220 of FIG. 1 correspond to high frequency power source 310 of FIG. 2. Primary coil 230 and primary self-resonant coil 240 of FIG. 1 correspond to primary coil 320 and primary self-resonant coil 330, respectively, of FIG. 2. Secondary self-resonant coil 110 and secondary coil 120 of FIG. 1 correspond to secondary self-resonant coil 340 and secondary coil 350, respectively, of FIG. 2. The elements of rectifier 130 and et seq. of FIG. 1 are generically represented as load 360.

Figure 3:
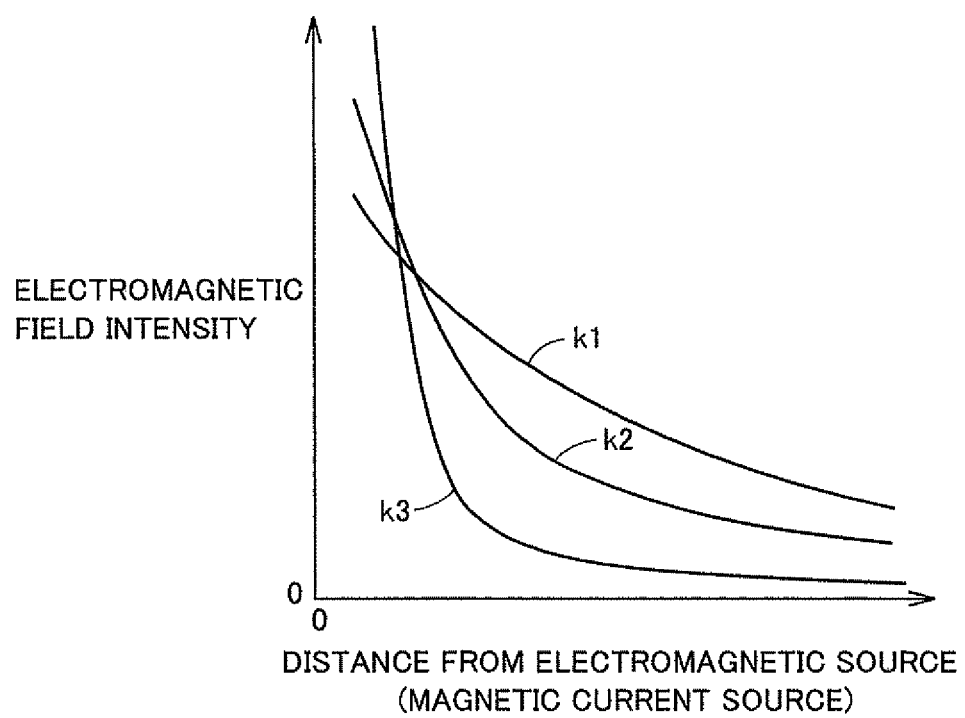
FIG. 3 represents the relationship between the distance from a current source (magnetic current source) and intensity of the electromagnetic field.

FIG. 3 represents the relationship between the distance from a current source (magnetic current source) and the electromagnetic field intensity. Referring to FIG. 3, the electromagnetic field includes three components. Curve k1 represents a component inversely proportional to the distance from the wave source, and is referred to as "radiation electromagnetic field". Curve k2 represents a component inversely proportional to the square of the distance from the wave source, and is referred to as "induction electromagnetic field". Curve k3 represents a component inversely proportional to the cube of the distance from the wave source, and is referred to as "electrostatic electromagnetic field".

There is a region thereof where the intensity of the electromagnetic wave decreases drastically according to the distance from the wave source. In the resonance method, energy (electric power) is transmitted taking advantage of the near field (evanescent field). Specifically, by causing a pair of resonators (for example, pair of LC resonant coils) having the same natural frequency to resonate taking advantage of the near field, energy (electric power) is transmitted from one resonator (primary self-resonant coil) to the other resonator (secondary self-resonant coil). Since this near field does not pass on energy (electric power) far away, the resonance method allows power transmission with lower energy loss as compared to an electromagnetic wave that transmits energy (electric power) by the "radiation electromagnetic field" that passes on energy over a great distance.

Figure 4:
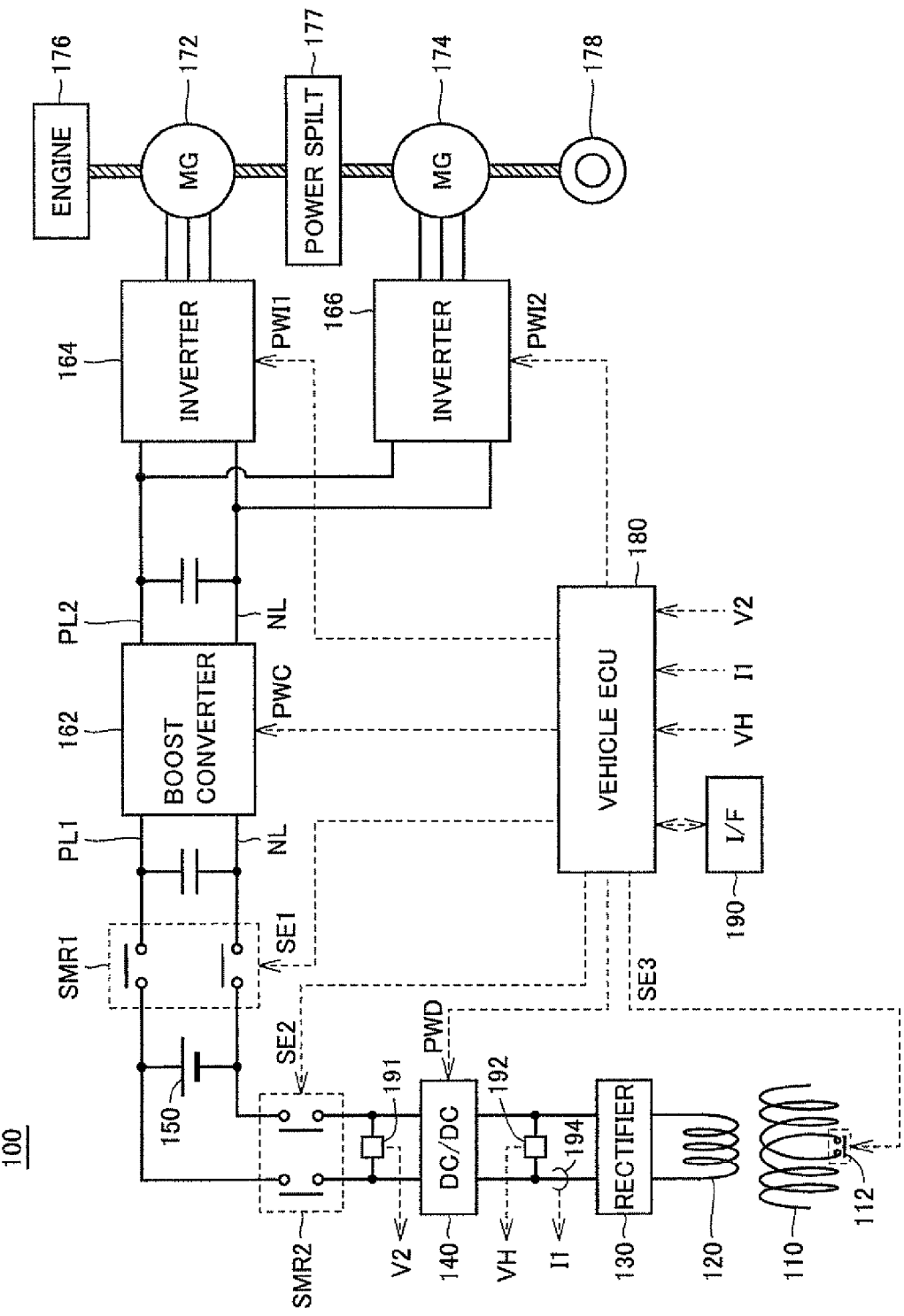
FIG. 4 is a block diagram representing a powertrain configuration of an electrical powered vehicle 100 shown in FIG. 1.

FIG. 4 is a block diagram representing a powertrain configuration of electrical powered vehicle 100 of FIG. 1, Referring to FIG. 4, electrical powered vehicle 100 includes a power storage device 150, a system main relay SMR1, a boost converter 162, inverters 164, 166, motor generators 172, 174, an engine 176, a power split device 177, and a driving wheel 178. Additionally, electrical powered vehicle 100 further includes secondary self-resonant coil 110, secondary coil 120, rectifier 130, DC/DC converter 140, system main relay SMR2, vehicle ECU 180, communication device 190, voltage sensors 191, 192, and current sensor 194.

Electrical powered vehicle 100 incorporates engine 176 and motor generator 174 as the driving source. Engine 176 and motor generators 172 and 174 are coupled with power split device 177. Electrical powered vehicle 100 runs by the driving power generated by at least one of engine 176 and motor generator 174. The power generated by engine 176 is divided into two paths by power split device 177. Specifically, one path is directed to driving wheel 178, and the other path is directed to motor generator 172.

Motor generator 172 is an AC rotating electric machine formed of, for example, a 3-phase AC synchronous electric motor having a permanent magnet embedded in a rotor. Motor generator 172 generates electric power using the kinetic energy of engine 176 divided by power split device 177. For example, when the SOC of power storage device 150 becomes lower than a predetermined value, engine 176 is started and electric power is generated by motor generator 172, whereby power storage device 150 is charged.

Motor generator 174 is also an AC rotating electric machine formed of, for example, a 3-phase AC synchronous electric motor having a permanent magnet embedded in a rotor, likewise with motor generator 172. Motor generator 174 generates driving power using at least one of the electric power stored at power storage device 150 and the electric power generated by motor generator 172. The driving power of motor generator 174 is transmitted to driving wheel 178.

In a braking mode of the vehicle or in an acceleration reducing mode at a downward slope, the mechanical energy stored at the vehicle as a kinetic energy or potential energy is used for the rotational drive of motor generator 174 through driving wheel 178, whereby motor generator 174 operates as a power generator. Accordingly, motor generator 174 operates as a regenerative brake converting the running energy into electric power to generate the braking force. The electric power generated by motor generator 174 is stored in power storage device 150. Motor generator 174 corresponds to motor 170 shown in FIG. 1.

Power split device 177 is formed of a planetary gear set including a sun gear, a pinion gear, a carrier, and a ring gear. The pinion gear engages with the sun gear and ring gear. The carrier supports the pinion gear to allow rotation on its axis, and is coupled to the crankshaft of engine 176. The sun gear is coupled to the rotational shaft of motor generator 172. The ring gear is coupled to the rotational shaft of motor generator 174 and to driving wheel 178.

System main relay SMR1 is disposed between power storage device 150 and boost converter 162. System main relay SMR1 electrically connects power storage device 150 with boost converter 162 when a signal SE1 from vehicle ECU 180 is rendered active, and disconnects the electrical path between power storage device 150 and boost converter 162 when signal SE1 is rendered inactive.

Boost converter 162 responds to a signal PWC from vehicle ECU 180 to boost the voltage output from power storage device 150 for output onto positive line PL2. This boost converter 162 includes, for example, a DC chopper circuit.

Inverters 164 and 166 are provided corresponding to motor generators 172 and 174, respectively. Inverter 164 drives motor generator 172 based on a signal PWI1 from vehicle ECU 180. Inverter 166 drives motor generator 174 based on a signal PWI2 from vehicle ECU 180. Each of inverters 164 and 166 includes a 3-phase bridge circuit, for example.

Boost converter 162 and inverters 164 and 166 correspond to PCU 160 of FIG. 1.

Secondary self-resonant coil 110 is divided into two at the central region where a relay 112 is provided. In a power reception mode, relay 112 is controlled to attain a connected state by a control signal SE3 from the vehicle ECU. The impedance of secondary self-resonant coil 110 is modified to an impedance (first state) allowing resonance with primary self-resonant coil 240 of FIG. 1. In a power reception stop mode, relay 112 is controlled to attain a non-connected state by control signal SE3 from the vehicle ECU. The impedance of secondary self-resonant coil 110 is modified to an impedance (second state) not allowing resonance with primary self-resonant coil 240 of FIG. 1.

Secondary coil 120, rectifier 130, and DC/DC converter 140 are as described with reference to FIG. 1. Therefore, description thereof will not be repeated. System main relay SMR2 is arranged between DC/DC converter 140 and power storage device 150. System main relay SMR2 electrically connects power storage device 150 with DC/DC converter 140 when a signal SE2 from vehicle ECU 180 is rendered active, and disconnects the electrical path between power storage device 150 and DC/DC converter 140 when signal SE2 is rendered inactive.

Voltage sensor 191 detects the inter-line voltage V2 of the power transmission paths between system main relay SMR2 and DC/DC converter 140, and provides the detection value to vehicle ECU 180. Voltage sensor 192 detects the inter-line voltage VH of the power transmission paths between rectifier 130 and DC/DC converter 140, and provides the detection value to vehicle ECU 180. Current sensor 194 detects a current I1 output from rectifier 130 and provides the detection value to vehicle ECU 180.

Vehicle ECU 180 generates signals PWC, PWI1 and PWI2 to drive boost converter 162, motor generator 172, and motor generator 174, respectively, based on the accelerator pedal position, vehicle speed, and signals from various sensors. The generated signals PWC, PWI1 and PWI2 are output to boost converter 162, inverter 164, and inverter 166, respectively.

In a vehicle running mode, vehicle ECU 180 renders signal SE1 active to turn on system main relay SMR1, and renders signal SE2 inactive to turn off system main relay SMR2. In the case where electric power can be received from the power feeding device during a running mode of the vehicle, vehicle ECU 180 may render signals SE1 and SE2 active to turn on both system main relays SMR1 and SMR2.

In a power receiving mode from power feeding device 200 external to the vehicle, vehicle ECU 180 renders signal SE1 inactive to turn off system main relay SMR1, and renders signal SE2 active to turn on system main relay SMR2.

Vehicle ECU 180 generates a signal PWD to control DC/DC converter 140 and provides the generated signal PWD to DC/DC converter 140. In addition, vehicle ECU 180 calculates the reception electric power from power feeding device 200 based on voltage VH from voltage sensor 192 and current I1 from current sensor 194 and transmits the calculated value to power feeding device 200 through communication device 190 together with the target value of the reception electric power.

Figure 5:
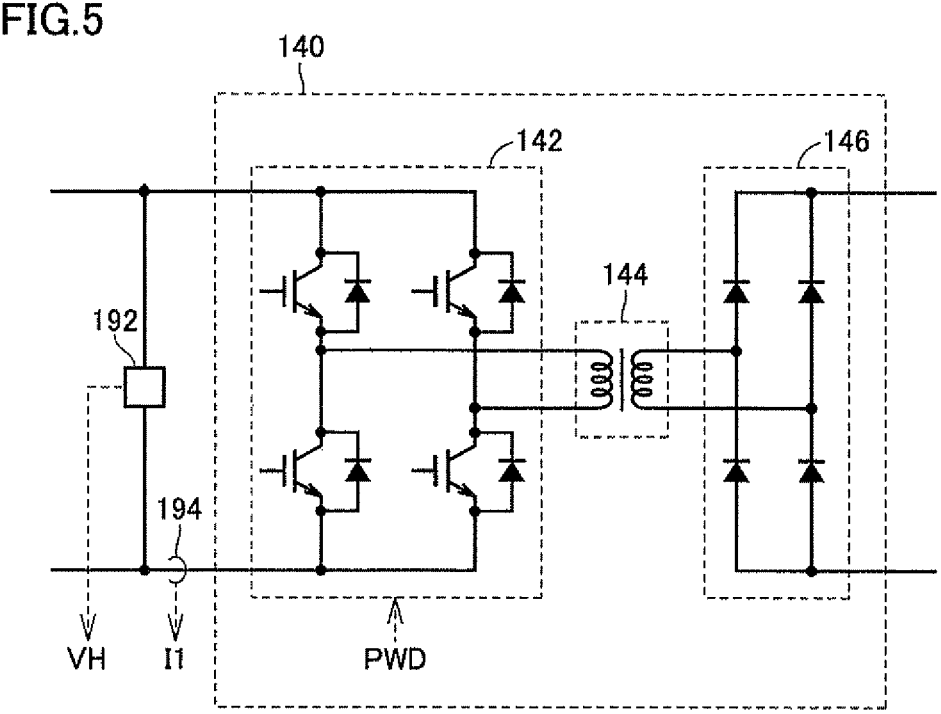
FIG. 5 is a circuit diagram of a DC/DC converter 140 shown in FIG. 1.

FIG. 5 is a circuit diagram of DC/DC converter 140 shown in FIG. 4. Referring to FIG. 5, DC/DC converter 140 includes a DC/AC conversion unit 142, a transformer unit 144, and a rectifier unit 146. DC/AC conversion unit 142 includes a switching element driven on/off based on signal PWD from vehicle ECU 180 to convert the DC power supplied from rectifier 130 of FIG. 4 into AC power for output to transformer unit 144.

Transformer unit 144 insulates DC/AC conversion unit 142 from rectifier unit 146 and carries out voltage conversion according to the coil winding ratio. Rectifier unit 146 rectifies the AC power output from transformer unit 144 into DC power for output to power storage device 150 of FIG. 4.

Figure 6:
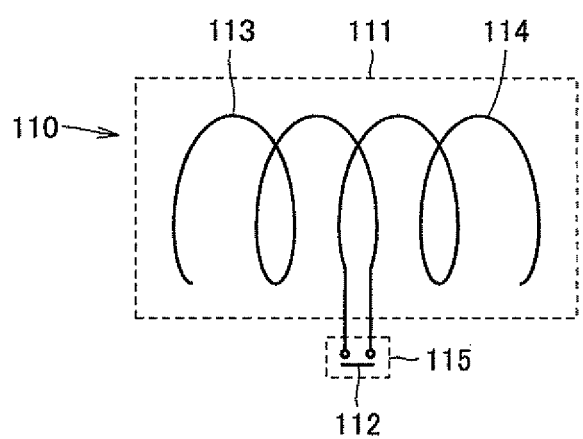
FIG. 6 represents a detailed configuration of a secondary self-resonant coil 110 of FIGS. 1 and 4.

FIG. 6 represents a detailed configuration of secondary self-resonant coil 110 of FIGS. 1 and 4.

Referring to FIG. 6, secondary self-resonant coil 110 is configured so as to be switchable between a first state and a second state. The first state is selected in a power reception mode in which secondary self-resonant coil 110 is magnetically coupled with primary self-resonant coil 240 of FIG. 1 through resonance. The second state is selected in a power non-reception mode in which the coupling of secondary self-resonant coil 110 with primary self-resonant coil 240 is weaker than in the first state.

Preferably, secondary self-resonant coil 110 has an impedance differing between the first state and the second state.

Specifically, secondary self-resonant coil 110 includes a coil body 111, and an impedance modifier 115 modifying the impedance of coil body 111.

Coil body 111 is divided at the central region into a first portion 113 and a second portion 114. Impedance modifier 115 includes a relay 112 provided at the central region of coil body 111 to connect and disconnect first portion 113 with/from second portion 114 in a power reception mode and a power non-reception mode, respectively.

Secondary self-resonant coil 110 operates as an antenna in a power reception mode. The amplitude of the voltage at the ends is increased, and the amplitude of the voltage at the central region becomes substantially 0. Therefore, by arranging relay 112 at the central region of coil body 111, only a small relay having a low breakdown voltage will be required as compared with the case where the relay is provided at other regions.

In the case where transmission of electric power is effected by way of the resonance method, the power transmission side is providing power. If the resonant frequency of the resonant coils matches each other, electric power will be received at the secondary self-resonant coil that is a component mounted on the vehicle even in the case where power reception is not intended at the power reception side. Thus, a configuration is employed to allow modification of the impedance of the secondary self-resonant coil, as shown in FIG. 6. In the case where the power reception side does not intend to receive power, the impedance is modified so that the resonant frequency does not match that of the power transmission side.

This is preferable to avoid power reception at a component mounted on the vehicle not requiring power reception.

Figure 7:
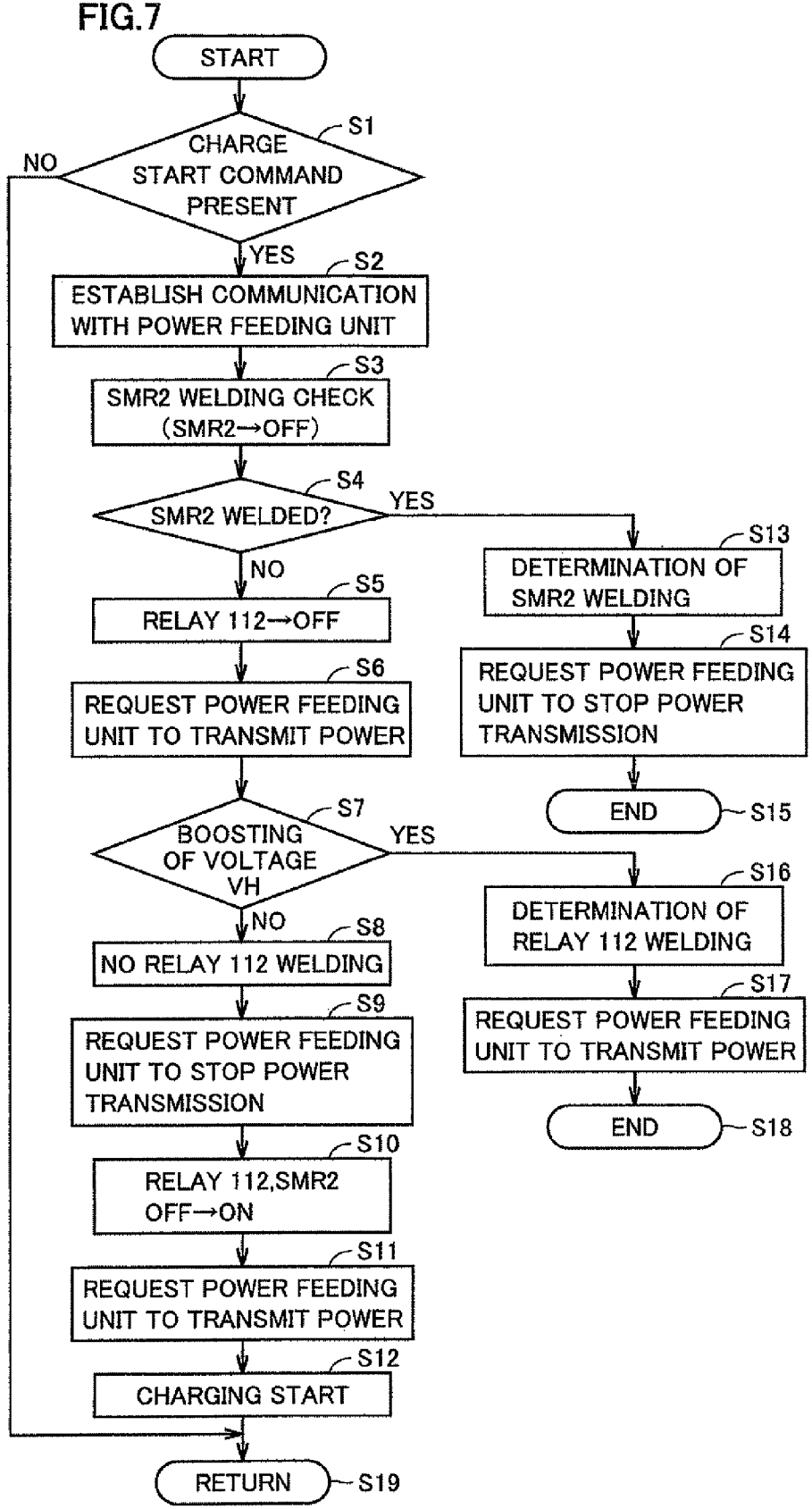
FIG. 7 is a flowchart to describe a charge start process executed by a vehicle ECU 180.

FIG. 7 is a flowchart to describe a charge start process executed at vehicle ECU 180. The process shown in this flowchart is invoked from a predetermined main routine to be executed.

Referring to FIG. 7, a determination is made whether there is a charge start command or not at step S1. A charge start command can be given by a passenger depressing a charge start button or the like. When a charge start command is given at step S1, control proceeds to step S2. When a charge start command is absent, control is transferred to the main routine at step S19.

When control proceeds to step S2, vehicle ECU 180 establishes communication with power feeding device 200 through communication device 190 of FIG. 1. At step S3, a welding check of system main relay SMR2 is executed.

Since power storage device 150 is disconnected when system main relay SMR2 attains an OFF state, voltage V2 detected by voltage sensor 191 of FIG. 4 should be reduced. By controlling system main relay SMR2 to attain an OFF state and confirming that voltage V2 has become lower than a predetermined threshold value that is set lower than the voltage of power storage device 150, it is recognized that system main relay SMR2 is set OFF properly and not welded. The result of welding check at step S3 is determined at step S4.

When a determination is made that welding has occurred at SMR2 at step S4, control proceeds to step S12. The determination result of welding occurred at SMR2 is ascertained and stored/notified. At step S14, vehicle ECU 180 requests power feeding device 200 through communication device 190 to stop power transmission. Then, the process ends at step S15.

When a determination is made that welding is not occurring at SMR2 at step S4, control proceeds to step S5. At step S5, vehicle ECU 180 controls relay 112 provided at secondary self-resonant coil 110 to attain an OFF state. Then, vehicle ECU 180 requests power feeding device 200 through communication device 190 to transmit power.

When power is transmitted from power feeding device 200, primary self-resonant coil 240 is controlled at the resonant frequency. If relay 112 is welded, the impedance of secondary self-resonant coil 110 will match that of primary self-resonant coil 240 with corresponding resonant frequency, causing secondary self-resonant coil 110 to resonate with primary self-resonant coil 240. Accordingly, electric power will be transferred so that voltage VH increases via secondary coil 120 and rectifier 130 of FIG. 4.

Therefore, by checking whether voltage VH is boosted or not at step S7, a determination of relay 112 being welded can be made. When boosting of voltage VH is detected at step S7, control proceeds to step S16. At step S16, the determination result of welding occurred at relay 112 is ascertained, and stored/notified. At step S17, vehicle ECU 180 requests power feeding device 200 through communication device 190 to stop power transmission. At step S18, the process ends. The electric power transferred for the purpose of welding check at step S6 is extremely weak, and smaller than the electric power transferred afterwards at step S11 for actual power transmission.

In the case where boosting of voltage VH is not detected at step S7, control proceeds to step S8. At step S8, relay 112 is rendered OFF normally, and a determination is made that welding is not occurring. At step S9, vehicle ECU 180 requests power feeding device 200 through communication device 190 to temporarily stop power transmission. At step S10, vehicle ECU 180 controls relay 112 that is at an OFF state and system main relay SMR2 to both attain an ON state. At step S11, vehicle ECU 180 requests power feeding device 200 through communication device 190 to temporarily stop power transmission. At step S12, a charging process is initiated. Then, control is transferred to the main routine at step S19.

Figure 8:
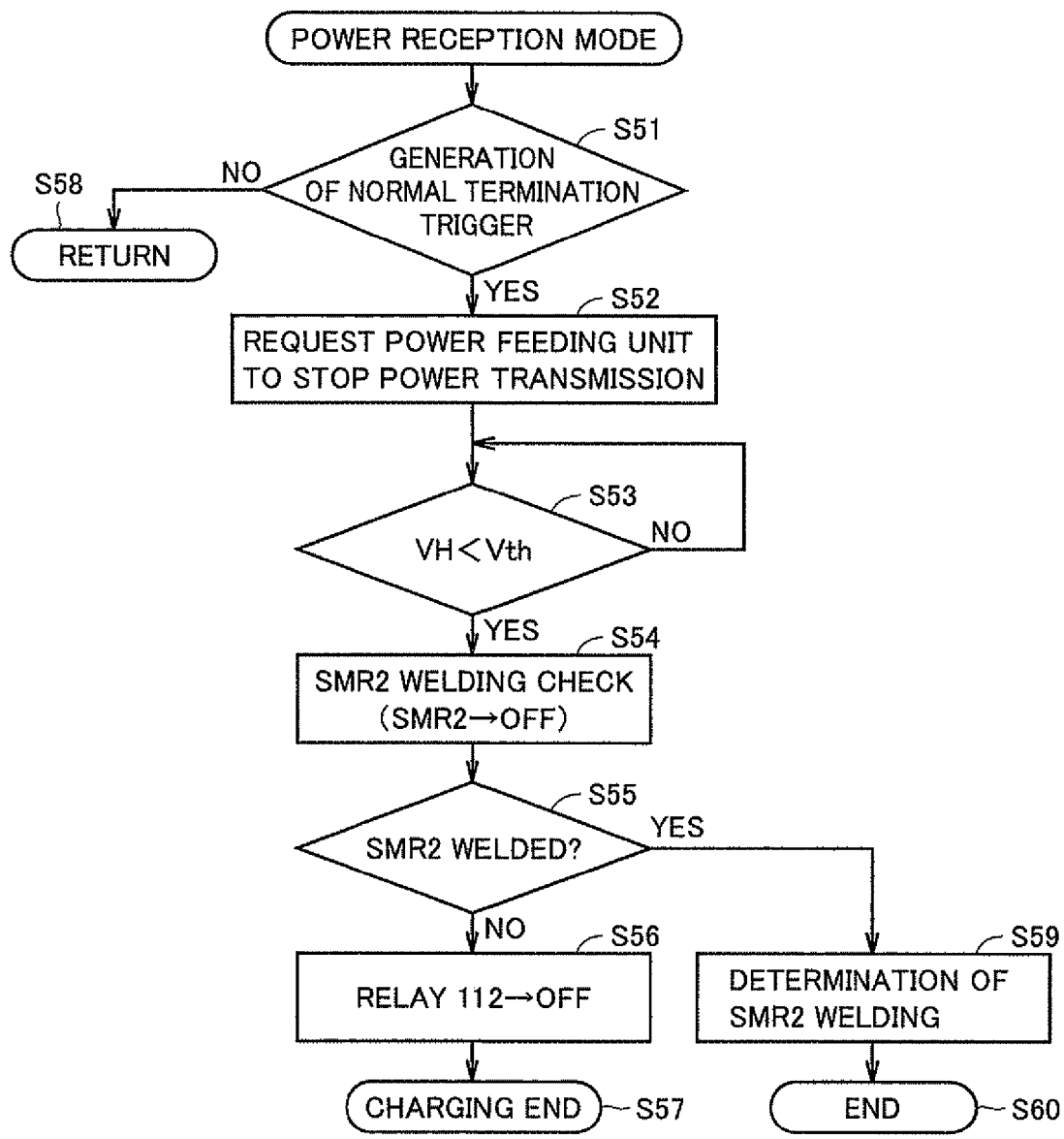
FIG. 8 is a flowchart of a process in the case of normal termination during power reception.

FIG. 8 is a flowchart of a process in the case of normal termination during power reception.

Referring to FIG. 8, whether a normal termination trigger is generated or not is monitored at step S51 during a power reception mode of the non-contact power reception device of the vehicle. A normal termination trigger is generated in the case where charging has progressed such that the state of charge (SOC) of power storage device 150 reaches the administrative upper limit (the value of full charge), in the case where the charge end button has been depressed, and in the case where the battery temperature or battery voltage is outside a predetermined range suitable for charging.

Control proceeds to step S58 when such a normal termination trigger is not generated, and control is transferred to the main routine. In this case, the power reception condition is met, and secondary self-resonant coil 110 is controlled to attain a state capable of receiving power. Then, step S51 is executed again at an elapse of a predetermined period of time.

When generation of a normal termination trigger is confirmed at step S51, control proceeds to step S52. At step S52, vehicle ECU 180 requests power feeding device 200 through communication device 190 to stop power transmission. Accordingly, voltage VH detected at voltage sensor 192 of FIG. 4 begins to decrease. Waiting is conducted at step S53 until voltage VH become as low as a threshold value Vth (for example, 42V) sufficiently lower than the power supply voltage (for example, several hundred V) of power storage device 150.

When VH<Vth is established at step S53, control proceeds to step S54. At step S54, welding check of system main relay SMR2 is executed. This welding check can be made by disconnecting power storage device 150 from voltage sensor 192 with system main relay SMR2 at an OFF state, and detecting voltage V2 through voltage sensor 192 at such a state.

If voltage V2 is not lower than the threshold voltage set sufficiently lower than the voltage of power storage device 150 at step S55, a determination is made that power storage device 150 is not disconnected and system main relay SMR2 is welded, whereby control proceeds to step S59. At step S59, a determination result of welding occurred at system main relay SMR2 is ascertained, and stored/notified. At step S60, the process ends.

When voltage V2 is less than or equal to the threshold value set sufficiently lower than the voltage of power storage device 150 at step S55, a determination is made that power storage device 150 is disconnected, and system main relay SMR2 is not welded. In this case, control proceeds to step S56. At step S56, vehicle ECU 180 controls relay 112 to attain an OFF state such that secondary self-resonant coil 110 does not resonate with primary self-resonant coil 240. At step S57, the process ends.

Figure 9:
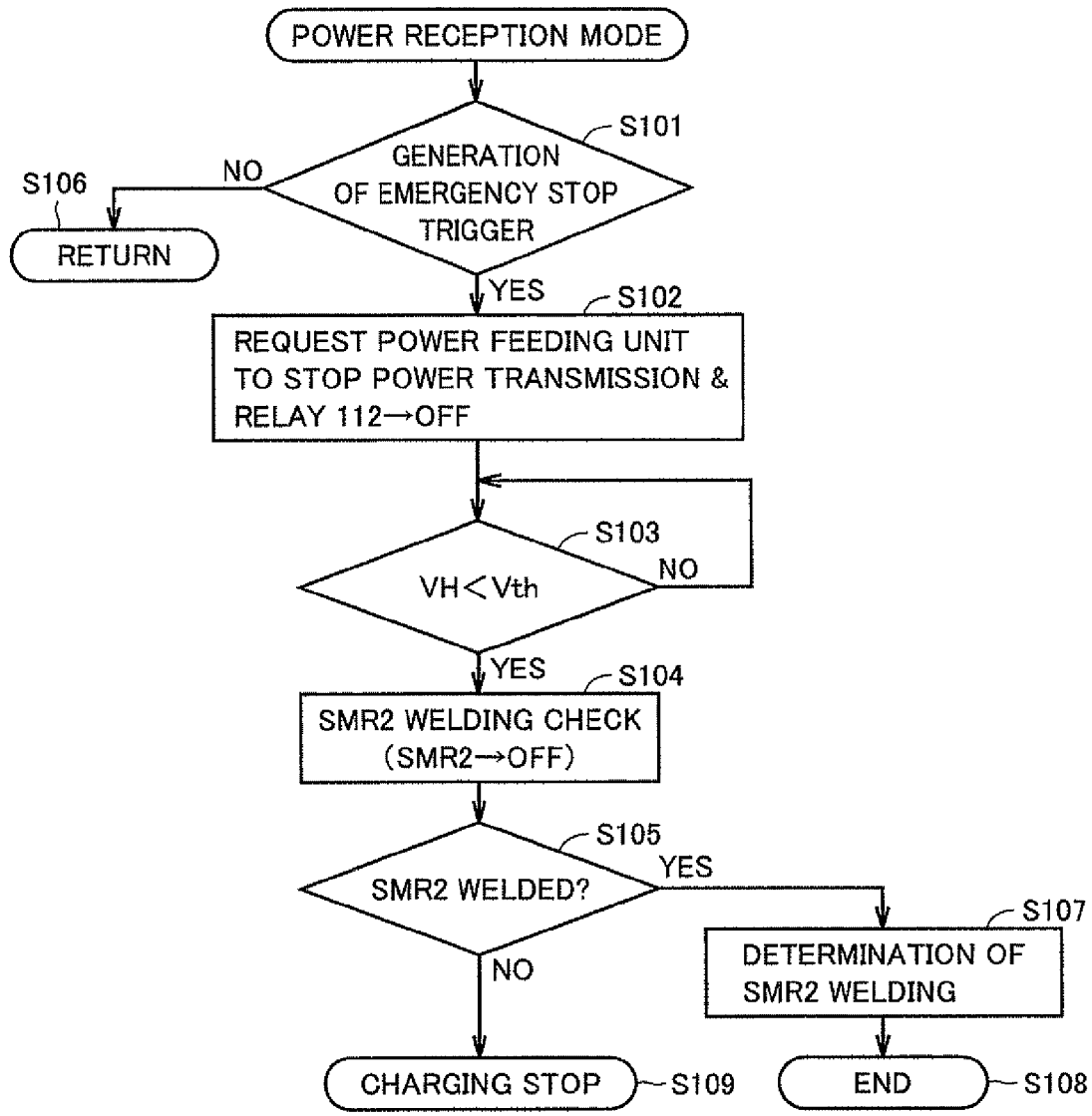
FIG. 9 is a flowchart of a process in the case of forced termination due to occurrence of an error during power reception.

FIG. 9 is a flowchart representing a process in the case of forced termination due to an error occurring during power reception.

Referring to FIG. 9, whether an emergency stop trigger is generated or not is monitored at step S101 during a power reception mode of the non-contact power reception device of the vehicle. An emergency stop trigger is generated when a failure that requires servicing of the vehicle has occurred such as damage at rectifier 130 or DC/DC converter 140.

If such an emergency stop trigger is not generated, control proceeds to step S106, and control is transferred to the main routine. In this case, the power reception condition is met, and secondary self-resonant coil 110 is controlled to attain a state capable of power reception. Then, step S101 is executed at an elapse of a predetermined period of time.

When generation of an emergency stop trigger is confirmed at step S101, control proceeds to step S102. At step S102, vehicle ECU 180 requests power feeding device 200 to stop power transmission through communication device 190, and sets relay 112 at an OFF state so as to avoid power reception by resonating with secondary self-resonant coil 110.

Accordingly, voltage VH detected at voltage sensor 192 of FIG. 4 begins to decrease. Waiting is conducted at step S103 until voltage VH becomes as low as threshold value Vth (for example, 42V) sufficiently lower than the power supply voltage (for example, several hundred V) of power storage device 150.

When VH<Vth is established at step S103, control proceeds to step S104. At step S104, welding check of system main relay SMR2 is executed. The welding check is effected by disconnecting power storage device 150 from voltage sensor 191 with system main relay SMR2 at an OFF step, and detecting voltage V2 through voltage sensor 191 in such a state.

When voltage V2 is not lower than the threshold value set sufficiently lower than the voltage of power storage device 150 at step S105, a determination is made that power storage device 150 is not disconnected, and system main relay SMR is welded, whereby control proceeds to step S107. At step S107, a determination result of welding occurring at system main relay SMR2 is ascertained, and stored/notified. Then, the process ends at step S108.

When voltage V2 is less than or equal to the threshold value sufficiently lower than the voltage of power storage device 150, a determination is made that power storage device 150 is disconnected and system main relay SMR2 is not welding at step S105. In this case, control proceeds to step S109 to achieve a charge stop state.

As described above, the non-contact power reception device of the first embodiment takes a configuration in which the impedance is modified such that secondary self-resonant coil 110 does not resonate when power reception is not desired at the vehicle. The modification is effected by modifying the inductance by dividing the length of the coil with a relay. Accordingly, generation of an undesirable high voltage can be avoided since there is no portion for receiving the power electric power at the vehicle even if power transmission is continued at the power feeding device side.

Second Embodiment

The second embodiment is a modification of the configuration of secondary self-resonant coil 110 shown in FIGS. 4 and 6 of the first embodiment. Since the configuration of the remaining elements are similar to those of the first embodiment, description thereof will not be repeated.

Figure 10:
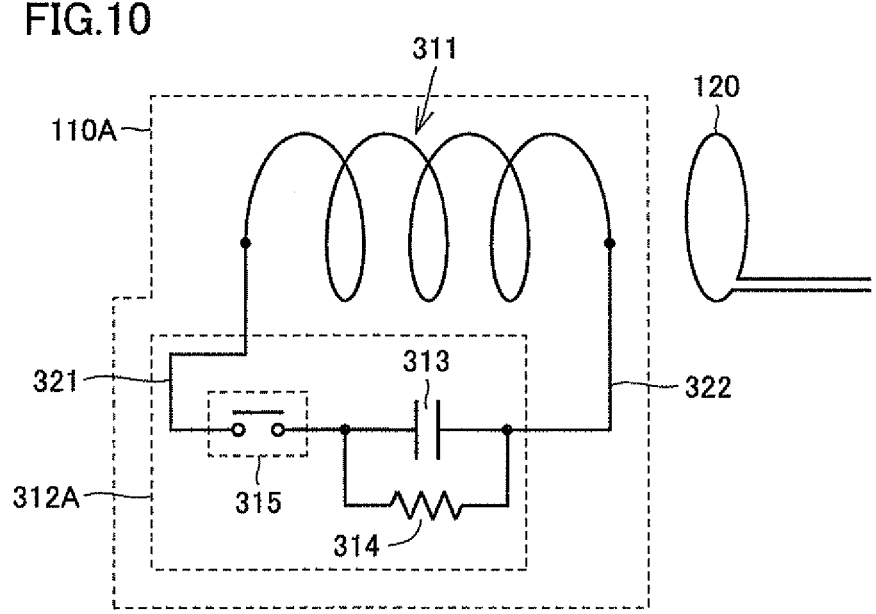
FIG. 10 is a circuit diagram of a configuration of a secondary self-resonant coil 110A employed in a non-contact power reception device of a second embodiment.

FIG. 10 is a circuit diagram of a configuration of secondary self-resonant coil 110A employed in the non-contact power reception device of the second embodiment.

Referring to FIG. 10, secondary self-resonant coil 110A is configured so as to be switchable between a first state and a second state. The first state is selected in a power reception mode in which secondary self-resonant coil 110A is magnetically coupled with primary self-resonant coil 240 of FIG. 1 through resonance. The second state is selected in a power non-reception mode in which the coupling of secondary self-resonant coil 110A with primary self-resonant coil 240 is weaker than in the first state.

Secondary self-resonant coil 110A has an impedance differing between the first state and the second state. Specifically, secondary self-resonant coil 110A includes a coil body 311, and a capacitance modifier 312A modifying the capacitance of coil body 311.

Capacitance modifier 312A includes a leading line 321 connected to an end of the coil body, a relay 315 connected to leading line 321, and a capacitor 313 connected to coil body 311 via leading line 321 by relay 315 in a power reception mode, and disconnected from coil body 311 by relay 315 in a power non-reception mode.

Secondary self-resonant coil 110A further includes a discharging resistor 314 for setting capacitor 313 at a discharging state in a power non-reception mode. Discharging resistor 314 is connected across the two electrodes of capacitor 313. Capacitor 313 is connected between a leading line 322 connected to the other end of coil body 311 and relay 315.

Figure 11:
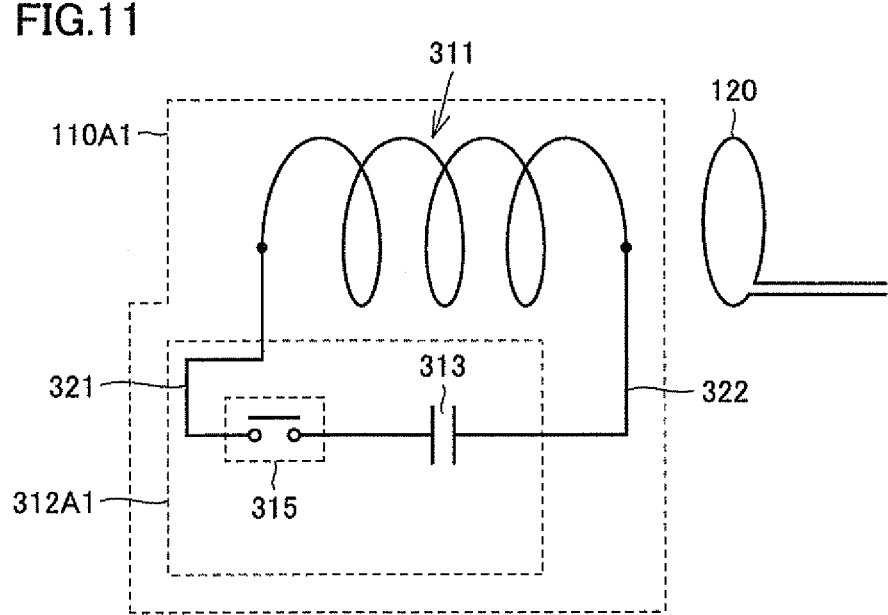
FIG. 11 is a circuit diagram of a configuration of a secondary self-resonant coil 110A1 that is a modification of secondary self-resonant coil 110A.

FIG. 11 is a circuit diagram representing a configuration of secondary self-resonant coil 110A1 that is a modification of secondary self-resonant coil 110A.

Referring FIGS. 10 and 11, secondary self-resonant coil 110A1 includes a capacitance modifier 312A1, instead of capacitance modifier 312A, in the configuration of secondary self-resonant coil 110A. Capacitance modifier 312A1 is a version of capacitance modifier 312 of FIG. 10 having discharging resistor 314 deleted. The configuration of the remaining elements are similar to those of capacitance modifier 312, so that the description is not repeated.

Figure 12:
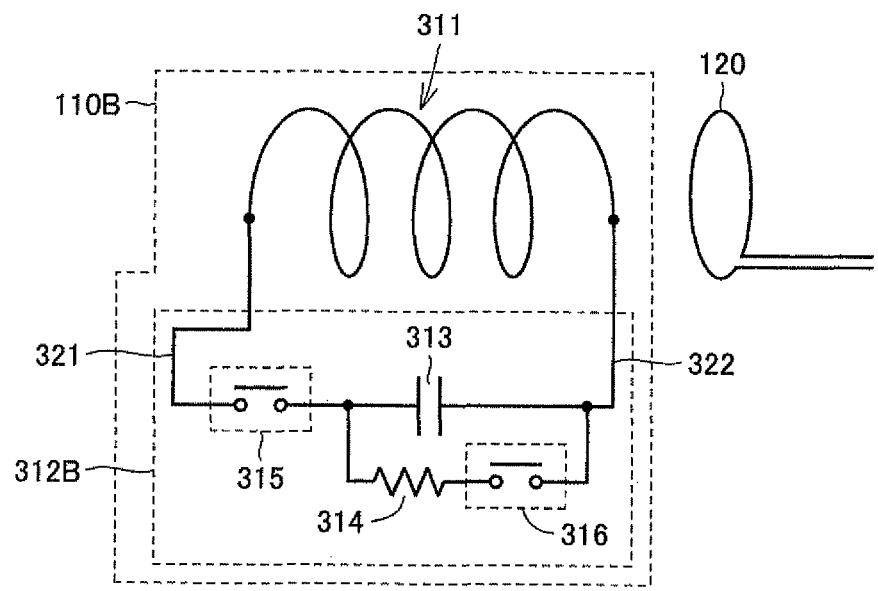
FIG. 12 is a circuit diagram of a configuration of a secondary self-resonant coil 110B that is a modification of secondary self-resonant coil 110A.

FIG. 12 is a circuit diagram of a configuration of a secondary self-resonant coil 110B that is a modification of secondary self-resonant coil 110A.

Referring to FIGS. 10 and 12, secondary self-resonant coil 110B includes a capacitance modifier 312B, instead of capacitance modifier 312A, in the configuration of secondary self-resonant coil 110A.

Capacitance modifier 312B includes a leading line 321 connected to an end of the coil body, a relay 315 connected to leading line 321, and a capacitor 313 connected with coil body 311 via leading line 321 by relay 315 in a power reception mode, and disconnected from coil body 311 by relay 315 in a power non-reception mode.

Secondary self-resonant coil 110B further includes a discharging resistor 314 for setting capacitor 313 at a discharging state in a power non-reception mode.

Secondary self-resonant coil 110B further includes another relay 316 disconnecting discharging resistor 314 from capacitor 313 in a power reception mode, and connecting the discharging resistor from the capacitor in a power non-reception mode.

Discharging resistor 314 and another relay 316 are connected in series between the two electrodes of capacitor 313. Capacitor 313 is connected between a leading line 322 connected to the other end of coil body 311 and relay 315.

Vehicle ECU 180 of FIG. 4 controls relay 315 to attain an ON state and relay 316 to attain an OFF state in a power reception mode, and controls relay 315 to attain an ON state and relay 316 to attain an OFF state in a power non-reception mode.

Figure 13:
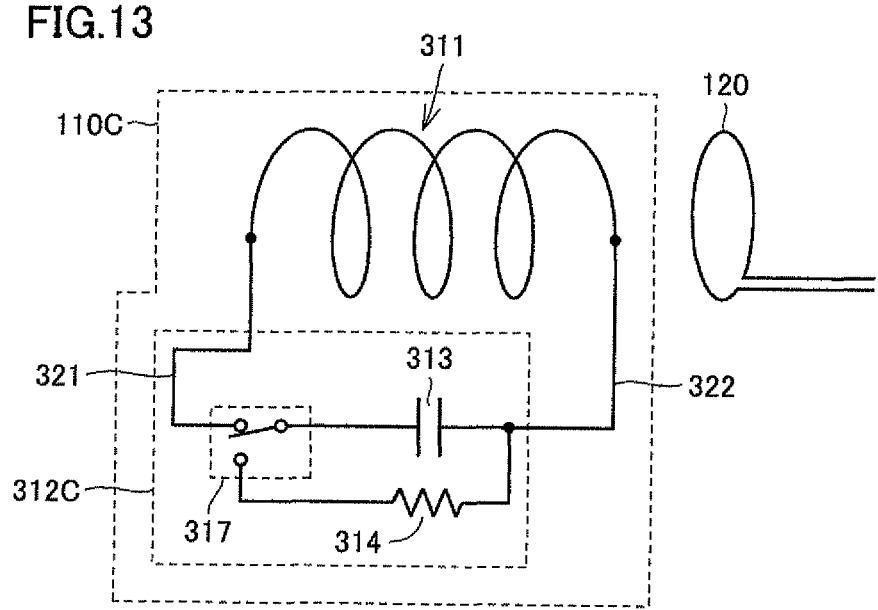
FIG. 13 is a circuit diagram of a configuration of a secondary self-resonant coil 110C that is another modification of secondary self-resonant coil 110A.

FIG. 13 is a circuit diagram of a configuration of a secondary self-resonant coil 110C that is another modification of secondary self-resonant coil 110A.

Referring to FIGS. 10 and 13, secondary self-resonant coil 110C includes a capacitance modifier 312C, instead of capacitance modifier 312A, in the configuration of secondary self-resonant coil 110A.

Capacitance modifier 312C includes a leading line 321 connected to an end of the coil body, a relay 317 connected to leading line 321, and a capacitor 313 connected with coil body 311 via leading line 321 by relay 317 in a power reception mode, and disconnected from coil body 311 by the relay in a non-reception mode.

Secondary self-resonant coil 110C further includes a discharging resistor 314 for setting capacitor 313 at a discharging state in a power non-reception mode.

Relay 317 disconnects discharging resistor 314 from capacitor 313 in a power reception mode, and connects discharging resistor 314 with capacitor 313 in a power non-reception mode.

Vehicle ECU 180 controls relay 317 such that an end of coil body 311 is connected to one end of the capacitor, and discharging resistor 314 is disconnected from that one end in a power reception mode. Vehicle ECU 180 controls relay 317 such that an end of coil body 311 is disconnected from one end of the capacitor, and that one end of the capacitor is connected with discharging resistor 314 in a power non-reception mode.

As described above, even if power was transmitted from the power feeding device, the region where power reception by resonance is effected can be eliminated from the vehicle in the present embodiment when power reception is not required.

Although each of the embodiments is described based on a series/parallel type hybrid vehicle in which the driving power of engine 176 is split by power split device 177 to be transmitted to driving wheel 178 and motor generator 172 as an electrical powered vehicle shown in FIG. 4, the present invention is also applicable to other types of hybrid vehicles. For example, the present invention is applicable to the so-called series type hybrid vehicle using engine 176 only for driving motor generator 172, and the driving power of the vehicle is generated by motor generator 174 alone, a hybrid vehicle having only the regenerative energy among the kinetic energy generated by engine 176 collected as electric energy, a motor assistant type hybrid vehicle using the engine as the main motive power and assisted by the motor as necessary, and the like.

Further, the present invention is applicable to an electric vehicle that runs only by electric power, lacking an engine 176, or a fuel cell vehicle further including a fuel battery in addition to power storage device 150 as the DC power source. Moreover, the present invention is also applicable to an electrical powered vehicle 100 lacking a boost converter 162.

It should be understood that the embodiments disclosed herein are illustrative and non-restrictive in every respect. The scope of the present invention is defined by the terms of the claims, rather than the description of the embodiments set forth above, and is intended to include any modifications within the scope and meaning equivalent to the terms of the claims.

The invention claimed is:

1. A non-contact power reception device comprising:
   a load to which electric power is fed, and
   a receiving coil receiving electric power to be supplied to said load from an external transmission coil,
   said receiving coil having a switching portion configured to switch between a first state and a second state, said first state being selected in a power reception mode in which said receiving coil is magnetically coupled with said transmission coil through resonance of a magnetic field, and said second state being selected in a power non-reception mode in which magnetic coupling of said receiving coil with said transmission coil through resonance is weaker than in said first state,
   said receiving coil having an impedance differing between said first state and said second state,
   said receiving coil including a coil body, said coil body being divided at a central region into a first portion and a second portion, and
   said switching portion including an inductance modifier modifying an inductance of said coil body, said inductance modifier including a relay provided at the central region of said coil body, connecting and disconnecting said first portion and said second portion in a power reception mode and a power non-reception mode, respectively.

2. A non-contact power reception device comprising:
   a load to which electric power is fed, and
   a receiving coil receiving electric power to be supplied to said load from an external transmission coil,
   said receiving coil having a switching portion configured to switch between a first state and a second state, said first state being selected in a power reception mode in which said receiving coil is magnetically coupled with said transmission coil through resonance of a magnetic field, and said second state being selected in a power non-reception mode in which magnetic coupling of said receiving coil with said transmission coil through resonance is weaker than in said first state,
   said receiving coil including a coil body, and
   said switching portion including a capacitance modifier modifying a capacitance of said coil body, said capacitance modifier including
   a leading line connected to an end of said coil body,
   a relay connected to said leading line, and
   a capacitor connected to said coil body via said leading line by said relay in a power reception mode, and disconnected from said coil body by said relay in a power non-reception mode.

3. The non-contact power reception device according to claim 2, further comprising
   a discharging resistor for setting said capacitor at a discharging state in a power non-reception mode.

4. The non-contact power reception device according to claim 3, further comprising
   another relay disconnecting said discharging resistor from said capacitor in a power reception mode, and connecting said discharging resistor with said capacitor in a power non-reception mode.

5. The non-contact power reception device according to claim 3, wherein
   said relay disconnects said discharging resistor from said capacitor in a power reception mode, and connects said discharging resistor with said capacitor in a power non-reception mode.

6. The non-contact power reception device according to claim 1, further comprising:
   a voltage converter voltage-converting an input voltage for supply to said load, and
   a rectifier rectifying AC voltage and providing the rectified voltage to said voltage converter as said input voltage,
   wherein said receiving coil receives electric power from said transmission coil, and generates said AC voltage to be supplied to said rectifier.

7. The non-contact power reception device according to claim 1, wherein
   said non-contact power reception device is mounted on a vehicle, and receives electric power from said external transmission coil,
   said non-contact power reception device further comprising a control unit performing control to switch said receiving coil between said first state and said second state,
   wherein said control unit sets said receiving coil at said first state and at said second state when said vehicle meets and not meets a power reception condition, respectively.

8. The non-contact power reception device according to claim 7, wherein
   said vehicle includes a power storage device receiving charge electric power from said non-contact power reception device as said load,
   said power reception condition includes the condition that a state of charge of said power storage device is less than a threshold value.

9. The non-contact power reception device according to claim 7, wherein
said power reception condition includes the condition that a predetermined failure is not occurring at said vehicle.

10. A vehicle comprising the non-contact power reception device according to claim 1.

11. The non-contact power reception device according to claim 2, further comprising:
a voltage converter voltage-converting an input voltage for supply to said load, and
a rectifier rectifying AC voltage and providing the rectified voltage to said voltage converter as said input voltage,
wherein said receiving coil receives electric power from said transmission coil, and generates said AC voltage to be supplied to said rectifier.

12. The non-contact power reception device according to claim 2, wherein
said non-contact power reception device is mounted on a vehicle, and receives electric power from said external transmission coil,
said non-contact power reception device further comprising a control unit performing control to switch said receiving coil between said first state and said second state,
wherein said control unit sets said receiving coil at said first state and at said second state when said vehicle meets and not meets a power reception condition, respectively.

13. The non-contact power reception device according to claim 12, wherein
said vehicle includes a power storage device receiving charge electric power from said non-contact power reception device as said load,
said power reception condition includes the condition that a state of charge of said power storage device is less than a threshold value.

14. The non-contact power reception device according to claim 12, wherein
said power reception condition includes the condition that a predetermined failure is not occurring at said vehicle.

15. A vehicle comprising the non-contact power reception device according to claim 2.

* * * * *